United States Patent
Block et al.

(10) Patent No.: US 8,978,795 B2
(45) Date of Patent: Mar. 17, 2015

(54) AUXILIARY ROLLER

(75) Inventors: Wolfgang Block, Wermelskirchen (DE); Guenther Hofrichter, Velbert (DE)

(73) Assignee: TENTE GmbH & Co. KG, Wermelskirchen (DE)

( * ) Notice: Subject to any disclaimer, the term of this patent is extended or adjusted under 35 U.S.C. 154(b) by 0 days.

(21) Appl. No.: 13/981,403

(22) PCT Filed: Jan. 24, 2012

(86) PCT No.: PCT/EP2012/051014
§ 371 (c)(1),
(2), (4) Date: Jul. 24, 2013

(87) PCT Pub. No.: WO2012/110283
PCT Pub. Date: Aug. 23, 2012

(65) Prior Publication Data
US 2013/0299252 A1    Nov. 14, 2013

(30) Foreign Application Priority Data
Feb. 18, 2011    (DE) .......................... 10 2011 000 817

(51) Int. Cl.
*A61G 7/08*    (2006.01)
*B60K 1/00*    (2006.01)
*B62B 5/00*    (2006.01)
(Continued)

(52) U.S. Cl.
CPC . *A61G 7/08* (2013.01); *B62B 5/005* (2013.01); *B60K 1/00* (2013.01); *B60K 1/02* (2013.01); *B62D 63/04* (2013.01)
USPC .......................................................... 180/15

(58) Field of Classification Search
CPC ........ A61G 5/047; A61G 7/08; A61G 7/0507
USPC .............. 180/11, 12, 13, 15, 295, 65.51, 65.6
See application file for complete search history.

(56) References Cited

U.S. PATENT DOCUMENTS

| 1,172,456 A |   | 2/1916 | Hoadley |   |
|---|---|---|---|---|
| 3,263,983 A |   | 8/1966 | Bliven |   |
| 3,380,546 A | * | 4/1968 | Rabjohn | 180/15 |

(Continued)

FOREIGN PATENT DOCUMENTS

| EP | 1 911 429 A2 | 4/2008 |
|---|---|---|
| JP | 2006 000328 A | 1/2006 |
| WO | WO 2007/093549 A1 | 8/2007 |

OTHER PUBLICATIONS

International Search Report of PCT/EP2012/051014, dated Jul. 13, 2012.

*Primary Examiner* — Joseph Rocca
*Assistant Examiner* — Felicia L Brittman
(74) *Attorney, Agent, or Firm* — Collard & Roe, P.C.

(57) ABSTRACT

An additional roller has a rigid frame, with a drivable wheel which is mounted in the frame and has an axle. The wheel together with the frame can be raised or lowered by pivoting relative to a chassis, on which the additional roller is to be mounted. A compression spring is coupled rotatably at one end to the chassis, in order, in the lowered position, to load the wheel in respect of ground contact. A transverse connection connects two frame parts in the direction of an axle of the wheel. The compression spring is coupled at the other end to the transverse connection. The compression spring together with the frame pivots about the chassis-mounted pivot point during raising and lowering of the wheel.

12 Claims, 13 Drawing Sheets

(51) Int. Cl.
   *B60K 1/02*   (2006.01)
   *B62D 63/04*   (2006.01)

(56) References Cited

U.S. PATENT DOCUMENTS

| | | | |
|---|---|---|---|
| 6,286,165 B1 * | 9/2001 | Heimbrock et al. | 5/600 |
| 6,330,926 B1 * | 12/2001 | Heimbrock et al. | 180/65.51 |
| 6,752,224 B2 | 6/2004 | Hopper et al. | |
| 7,090,041 B2 * | 8/2006 | Vogel et al. | 180/19.3 |
| 7,419,019 B1 | 9/2008 | White et al. | |
| 7,882,582 B2 | 2/2011 | Kappeler et al. | |
| 8,567,537 B2 * | 10/2013 | Gomi et al. | 180/21 |
| 2003/0102172 A1 | 6/2003 | Kummer et al. | |
| 2003/0192725 A1 | 10/2003 | Heimbrock et al. | |
| 2010/0181122 A1 * | 7/2010 | Block et al. | 180/15 |

* cited by examiner

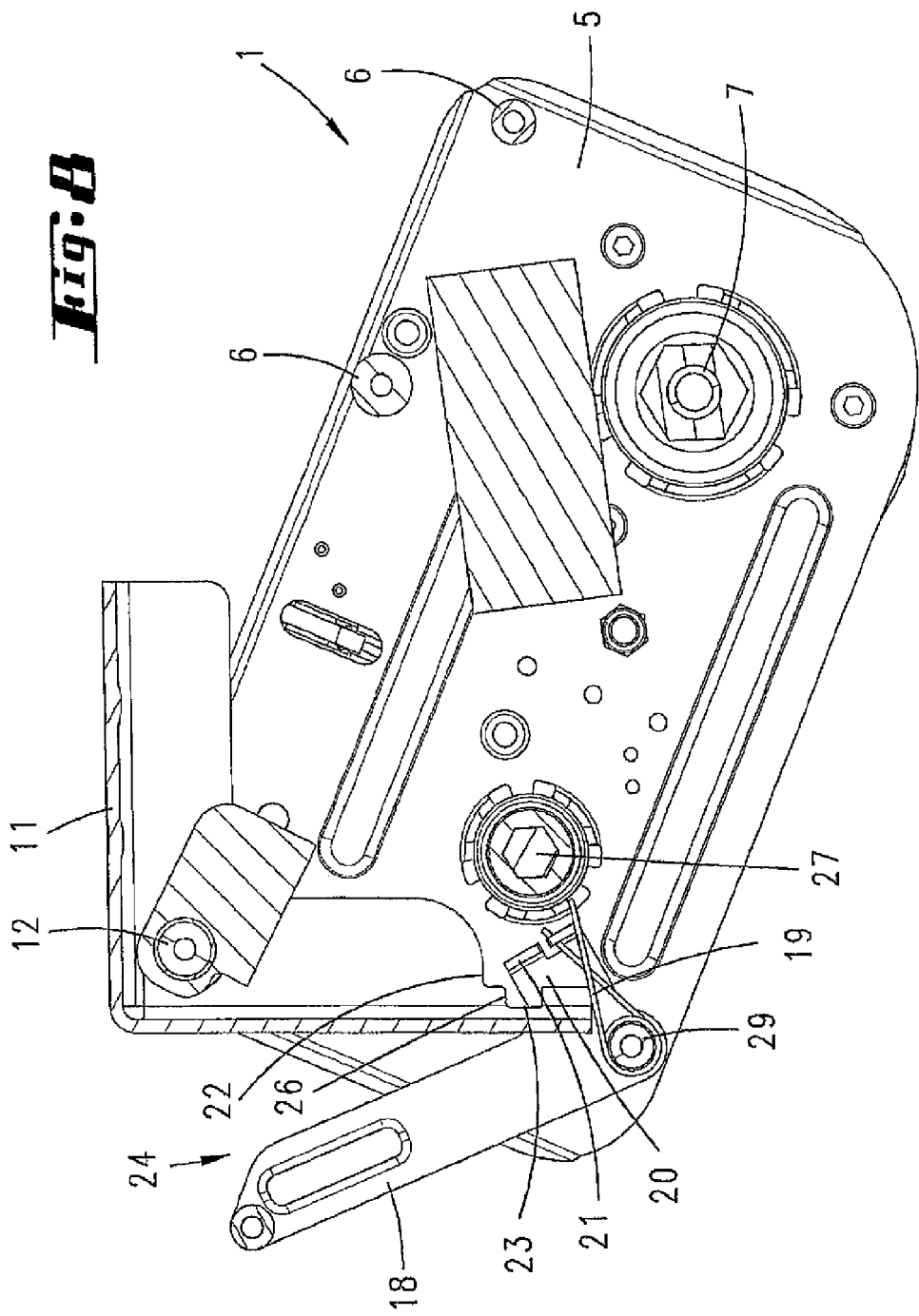

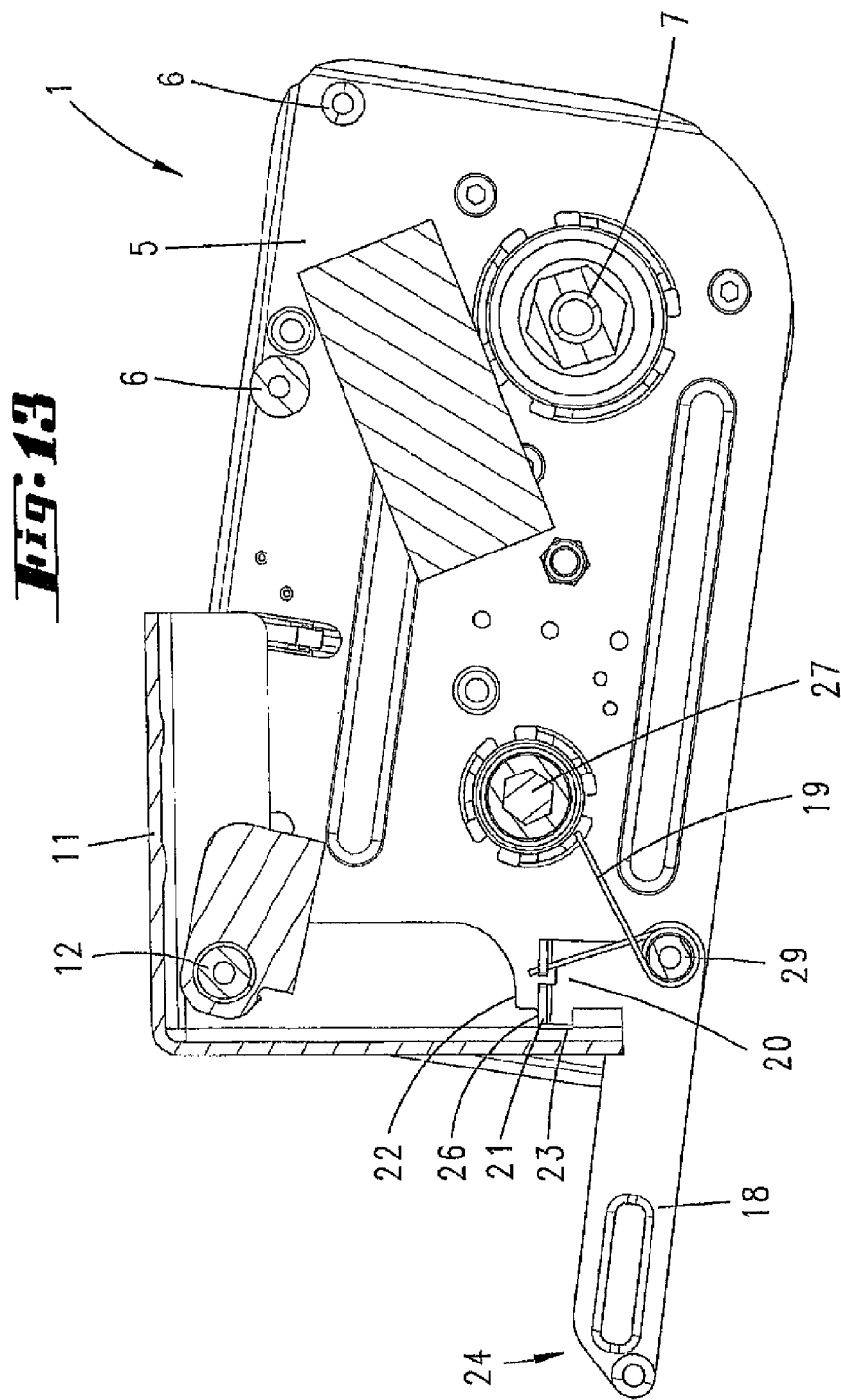

AUXILIARY ROLLER

CROSS REFERENCE TO RELATED APPLICATIONS

This application is the National Stage of PCT/EP2012/051014 filed on Jan. 24, 2012, which claims priority under 35 U.S.C. §119 of German Application No. 10 2011 000 817.9 filed on Feb. 18, 2011, the disclosure of which is incorporated by reference. The international application under PCT article 21(2) was not published in English.

BACKGROUND OF THE INVENTION

1. Field of the Invention

The invention relates to an auxiliary roller having a rigid frame, with a drivable wheel which is mounted in the frame and which has an axle, the wheel together with the frame, by pivoting, being raisable or lowerable relative to a chassis to which the auxiliary roller is to be attached, and a compression spring which is rotatably linked at one end to the chassis being provided in order to load the wheel with regard to ground contact in the lowered position.

2. Description of the Related Art

This type of auxiliary roller is known from U.S. Pat. No. 6,752,224 B2, for example. In the known auxiliary roller, the compression spring acts on the frame via a lever. A pivot motion of the compression spring is opposite from a pivot motion of the frame. The lever is mounted on the chassis. Overall, this represents a complicated construction.

In addition, reference is made to WO 2007/093549 A1 with regard to the prior art. The disclosure content of the latter-cited publication is hereby included in full in the disclosure of the present application, including for the purpose of incorporating features of the cited publication in claims of the present application. In this publication, the subject matter is designated on the one hand as an auxiliary roller overall, but on the other hand also as a wheel having an auxiliary roller. In order to make a conceptual distinction without this involving a substantive change, in the present application a distinction is made between the overall structural unit, which represents the auxiliary roller, and the wheel.

SUMMARY OF THE INVENTION

Based on the prior art cited in first instance, according to one aspect, it is an object of the invention is to provide a simple and effective arrangement of the compression spring with respect to the wheel or the frame accommodating the wheel. Further aspects are provided with regard to further features of the invention explained below. These further aspects may be of importance independently, alternatively, or also supplementally with regard to the above-stated object.

One possible approach to achieving the object is provided according to a first inventive concept, by the features that a transverse connection connecting two frame parts in the direction of the axle of the wheel is provided, that the compression spring is linked at the other end to the transverse connection, and that the compression spring together with the frame pivots about the pivot point which is fixed to the chassis, when the wheel is raised and lowered. The linkage of the compression spring is directly integrated into the structure of the frame. A transverse connection, which moves with the frame, for connecting two oppositely situated frame parts between which the auxiliary roller is preferably accommodated, pivots together with the frame and the end of the compression spring which acts on the auxiliary roller. Deflection of a lever is not necessary. In addition, the frame is acted on directly by the compression spring. The selected arrangement results in practically the same pressing force by which the wheel is pressed onto the ground, even for a different lowering of the wheel, for example in the case of a bump.

Further features of the invention are described or illustrated, also in the description of the figures and the drawings, often in their preferred association with the concept explained above, but may also be of importance in an association with only one or more individual features that are described here or illustrated in the drawings, or independently or in some other overall concept.

Thus, it is preferred that the compression spring presses the wheel in the raised position, also into this raised position. For this purpose, the linking point of the compression spring to the frame in the raised state of the wheel may be situated above the linking point of the compression spring to the chassis. In addition, in this regard no leverage is necessary. The desired pressing state in the raised position is directly achieved due to the provided linkage points. For this purpose, it may be practical to provide a projecting arm at a vertical distance beneath the chassis, on the chassis or on the portion of the overall arrangement of the auxiliary roller that is to be secured to the chassis, to which the compression spring is linked on the chassis side or fixed relative to the chassis. Thus, the desired pressing state in the raised state may be achieved without the need for raising the frame beyond a substantially horizontal orientation and/or beyond a connecting plane of the auxiliary roller or of the frame to the chassis.

It is further preferred that a guide rod passes through the compression spring. The guide rod is suitably directly linked to the chassis or to the associated part of the overall structure of the auxiliary roller, and to the frame, preferably acting on the transverse connection. The guide rod prevents the compression spring, which is preferably formed as a helical spring, from deflecting. In particular, it is also preferred that the guide rod has a telescoping capability. Since the compression spring is preferably secured to the chassis outside a rotating configuration of the frame relative to the chassis, this results in a change in length between the linking point to the chassis and that to the frame in the course of the pivoting. This change in length may be accommodated by the mentioned telescoping capability.

It is also preferred that the compression spring is situated in a vertical projection within the frame which accommodates the wheel. In a horizontal projection, i.e., in a projection in the direction of the axle of the wheel, it is further preferred that the compression spring is at least partially situated within the frame. In an upwardly pivoted position of the frame, the compression spring is preferably also accommodated in the frame in the horizontal projection. A compact structural unit is provided which may be mounted on various objects without the need for the significant interventions on a chassis to which the structural unit is to be attached.

A further part of the object, which, however, is also an independent, stand-alone object, is to provide an advantageous configuration with regard to a possible failure of the drive or with regard to a situation in which a lowered wheel is to be brought out of the active state as quickly as possible.

With regard to an auxiliary roller having a rigid frame in which a drivable wheel is mounted, the wheel, together with the frame, by pivoting, being raisable or lowerable relative to the chassis to which the wheel is to be attached, the aim is that an outwardly-protruding activating lever is linked to the frame for pivoting the wheel into the raised position without motorized assistance.

As a result of the wheel being alternatively raisable, even without motorized assistance, in exceptional situations such as in an emergency involving, for example, an auxiliary roller that is mounted on a hospital bed, in which the wheel is in the lowered position, the wheel may be brought out of the active state very quickly solely by bodily power. The lever may be configured in such a way that sufficient leverage is provided with regard to the required forces.

Also in this regard, further features are described or illustrated below, also in the description of the figures and the drawings, often in their preferred association with this concept. However, features of the concept described above or of the concepts described below may also be of importance.

It is preferred that the lever is pivotable relative to the frame and also relative to a mounting plate or to the chassis to which the wheel or the frame which supports the wheel is to be attached. A favorable starting position of the lever may thus be achieved. With regard to the pivotability, the lever may also be pushed into a preferred position relative to the frame by means of a spring.

It is particularly preferred that the lever is biased into its position which enables the lowered position of the wheel.

In addition, it is preferred that the lever allows the wheel to be raised into the nonactivated position, i.e., a position in which there is no contact with the ground, only until there is no longer any contact of the wheel with the ground, but on the other hand the raised position which usually is achievable by motor is also not assumed.

Furthermore, it is preferred that the raised position that is achievable by the lever is lockable. Lowering again is not possible unless this lock is released by means of special measures.

In particular, however, it is also preferred that the lock may be released by a simple customary motorized activation, namely, when customary motorized raising of the wheel is initiated, starting from the raised position achieved by use of the lever, so that a detent lock which accommodates the lever is moved relative to the lever until the lever, due to its spring bias, pivots back into its original position which does not hinder the raising and lowering.

For an auxiliary roller having a motor-driven wheel, as is the case here, in which the wheel is raisable or lowerable relative to a chassis to which the wheel is to be attached, this also results in the object of providing or achieving the strongest possible traveling drive.

This object is achieved according to another inventive concept, in that two electric motors are provided for the traveling drive of the wheel, and that the electric motors are situated on opposite sides relative to the wheel. This makes it possible for one or two electric motors to selectively act on the wheel in terms of the drive. Since these types of wheels are often operated by a battery or a rechargeable battery, an energy-saving operating method is thus made possible. As the result of providing two electric motors, which are also situated on opposite sides relative to the wheel, both electric motors may act directly on the same axle or shaft of the wheel. The oppositely situated configuration also results in a favorable distribution in terms of weight. However, it may also be provided that both electric motors continuously drive the wheel in unison.

It is preferably also provided that one or both electric motors is/are selectively drivable forwards or backwards to allow two opposite directions of travel of the object on which the wheel is mounted.

Furthermore, it is also preferably provided that one or both electric motors is/are drivable as a generator. This may be utilized, for example, for braking the device on which the auxiliary roller is mounted, such as when an auxiliary roller in operation is switched to "halt" or "stop." It may also be provided that the auxiliary wheel can be braked only by switching to a generator mode. A mechanical brake, in particular one which acts in a frictional manner, may then be dispensed with entirely. Since the object on which the auxiliary roller is mounted still has additional rollers, of which one or more is/are blockable, such an object is fixed via these rollers, particularly since the wheel of the auxiliary roller is generally in the raised position when the object is stationary.

In this regard, it is also preferably provided that this generator mode is continued only over a certain time period which is preferably selected not to be too long. In the course of switching off the traveling drive by means of the wheel, it is further preferably provided that the wheel is automatically raised into the inactive position, i.e., the position without ground contact, after a certain period of time. In the absence of action on the wheel, generator mode is then no longer possible, and accordingly is also not provided. This time period may be selected to be between 1 and 20 seconds, for example, wherein all intermediate values, in particular in 1/10 second increments, for example 1.1 or 19.9, etc., seconds, are hereby included in the disclosure, also for delimiting the selected time period from above and/or below, but also for the disclosure of individual values in the mentioned range.

BRIEF DESCRIPTION OF THE DRAWINGS

The invention is explained in greater detail below with reference to the accompanying drawings, which however illustrate only one exemplary embodiment. The drawings show the following:

FIG. 7 shows an illustration corresponding to FIG. 4, but in the lowered state of the wheel;

FIG. 8 shows an illustration corresponding to FIG. 5, but in the lowered state of the wheel;

FIG. 13 shows an illustration corresponding to FIG. 12, but in a section corresponding to FIG. 11.

DETAILED DESCRIPTION OF THE DRAWINGS

Figure 1:
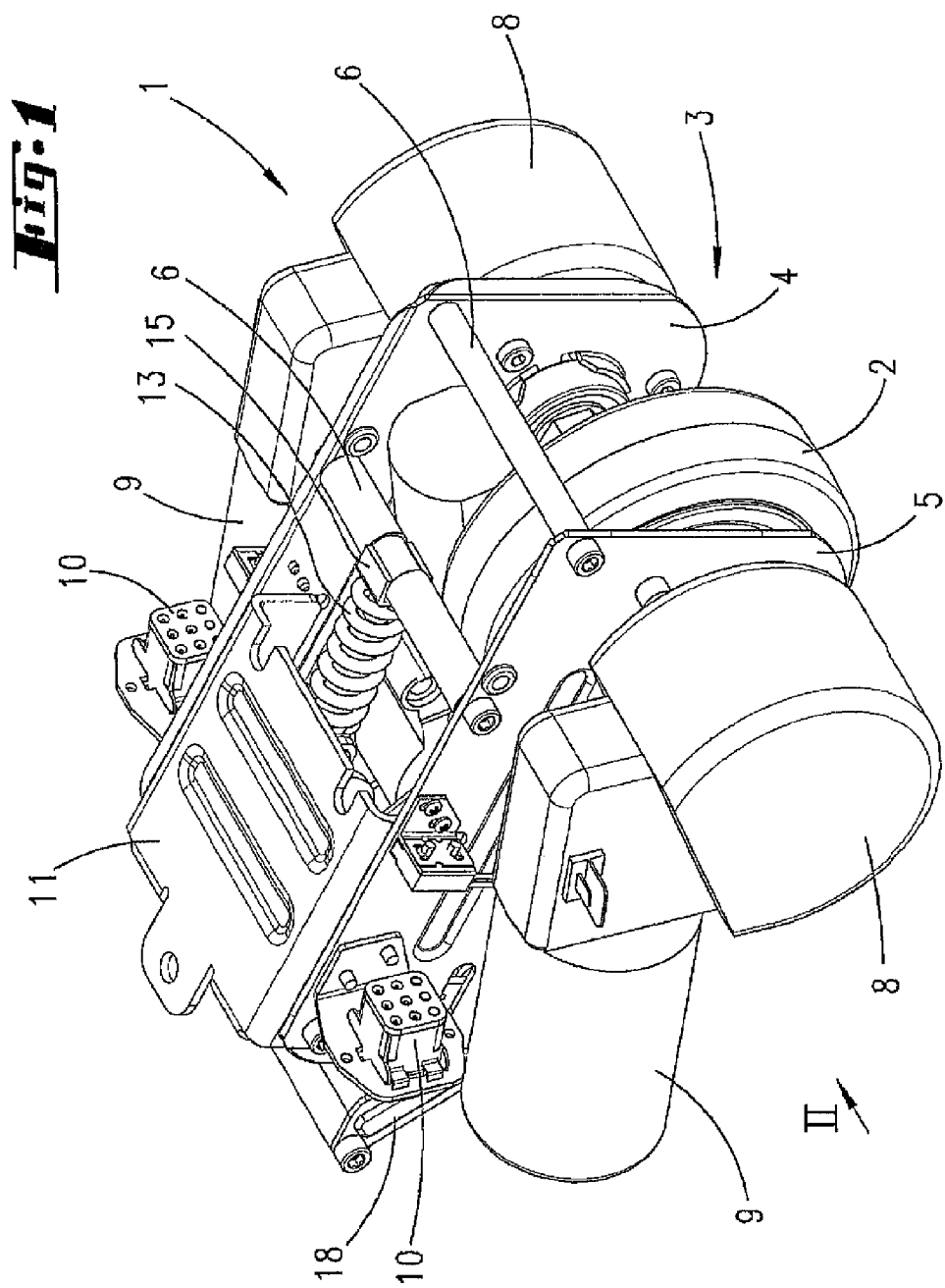
FIG. 1 shows a perspective view of the auxiliary roller structural unit, obliquely from above.
Figure 2:
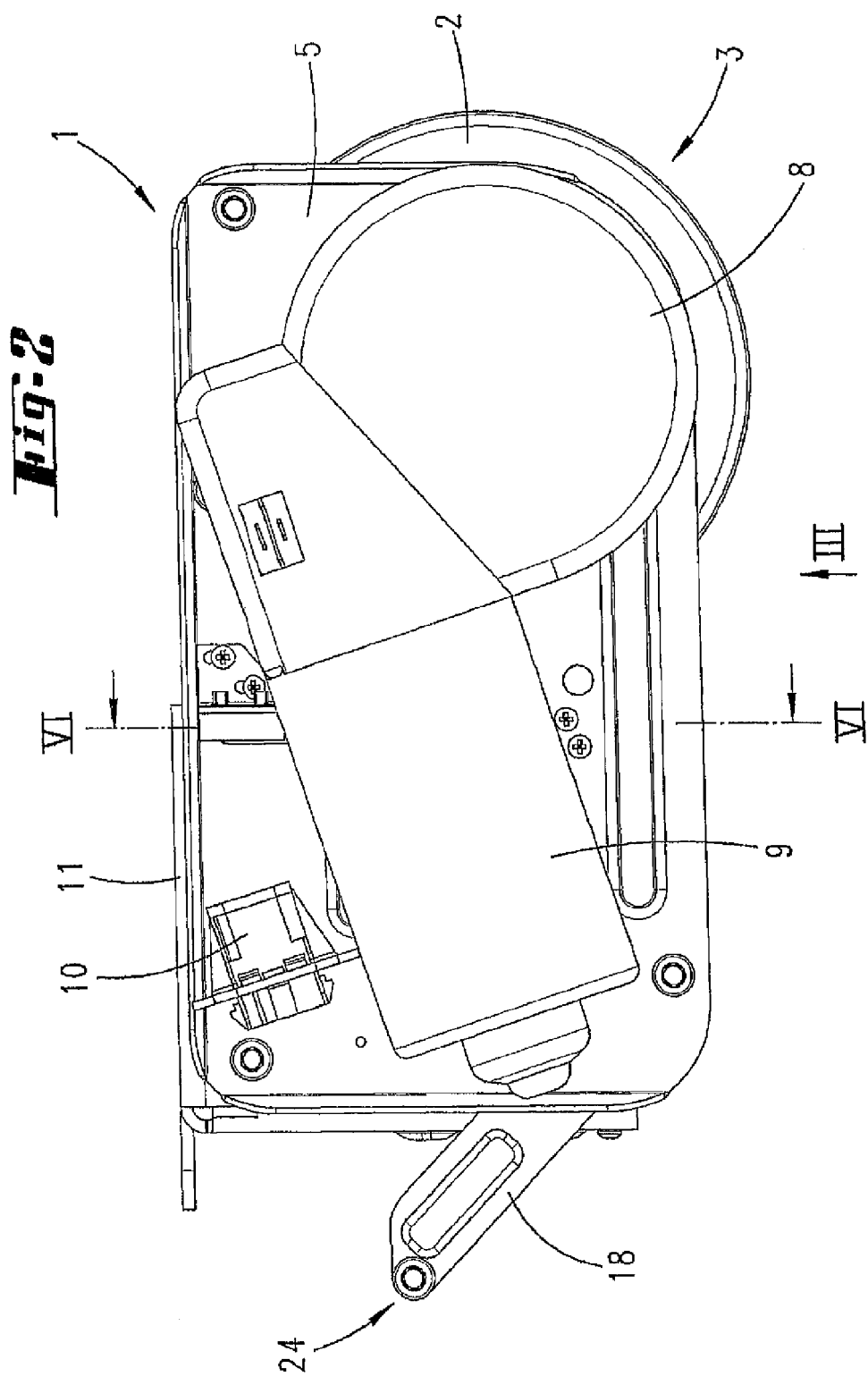
FIG. 2 shows a side view of the object according to FIG. 1.

A structural unit 1 which represents an auxiliary roller is illustrated and described, having a wheel 2, the structural unit 1 as a whole being mountable on a chassis. The wheel 2 is accommodated in a frame 3, which in the exemplary embodiment is composed of two frame parts 4, 5 that are connected to one another, for example via a transverse connection 6, to form a frame 3 that is movable as a unit.

Such a structural unit 1 may be mounted on a hospital bed, for example. However, the structural unit may also be mounted on transport devices such as a container or a shopping cart or the like. The structural unit is used for the traveling drive of such an object.

In addition, a battery and various control elements, which are then suitably electrically connected to the structural unit 1, are provided on the chassis, i.e., on the hospital bed, for example.

Figure 3:
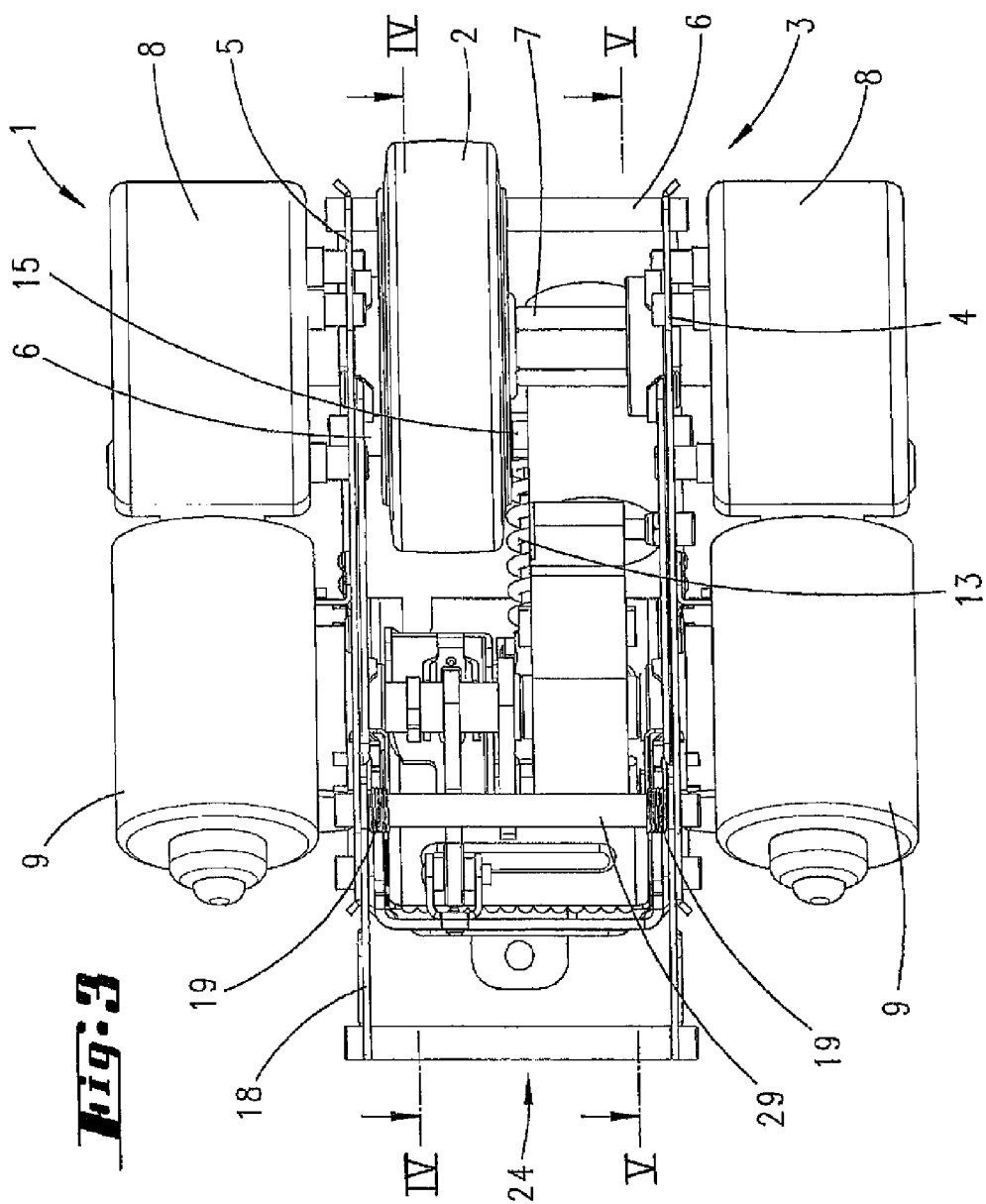
FIG. 3 shows a bottom view of the object according to FIG. 1.

The frame parts 4, 5 preferably extend parallel to one another. As is apparent in particular from FIG. 3, the wheel 2 is situated off-center with respect to the frame parts 4, 5 namely, situated closer to the frame part 5. For example, an advantageous enclosure within the units described below is thus achieved.

The running direction of the wheel 2 is parallel to the frame parts 4, 5. The shaft 7 (also see FIG. 4) of the wheel 2 is accommodated in the frame parts 4, 5 by bearings.

In the exemplary embodiment, with regard to the version with two electric drives, the shaft 7 protrudes beyond the frame parts 4, 5 on both sides, and in each case is connected there to gearing 8 and an electric motor 9. The gearing 8 and the electric motor 9 are secured to each of the frame parts 4 and 5 from the outside. The gearing 8 is preferably formed in such a way that it is not self-locking and has the lowest possible internal friction. A free-wheeling effect, for example, may also be achieved in this way.

With regard to the above-mentioned suitable electrical connection, connecting plugs 10 are also provided on the frame, for example, for supplying power to an electric motor 9, but also for the control system.

A mounting plate 11 is provided in addition to the frame parts 4, 5. In the exemplary embodiment, the mounting plate 11 is situated between the frame parts 4, 5, regions of the plate being associated with the underside of, for example, a chassis of a hospital bed. The frame 3 is pivotably connected via a pin 12 to the mounting plate 11, which in the installed state is fixedly connected to the chassis of the object in question. In the exemplary embodiment, the pin 12 is connected by screws to the frame parts 4, 5, which are formed as frame walls. The frame parts 4, 5 are preferably connected not only via the pin 12, but also via the mentioned shaft 7 of the wheel 2 and transverse connections 6.

In addition, in the embodiment, a compression spring 13 is provided which is connected at one end to the chassis or to the mounting plate 11 (see FIG. 4), and at the other end is connected to the frame 3.

The compression spring 13 is situated on a telescoping tube 14 which in particular also hinders buckling of the helical spring, in the exemplary embodiment the telescoping tube 14 cooperating on the one hand with a pivot pin 16 of the mounting plate 11 and on the other hand with a transverse connection 6, via clip ends 15. The compression spring could also act, for example, on only one of the frame parts 4, 5.

Figure 4:
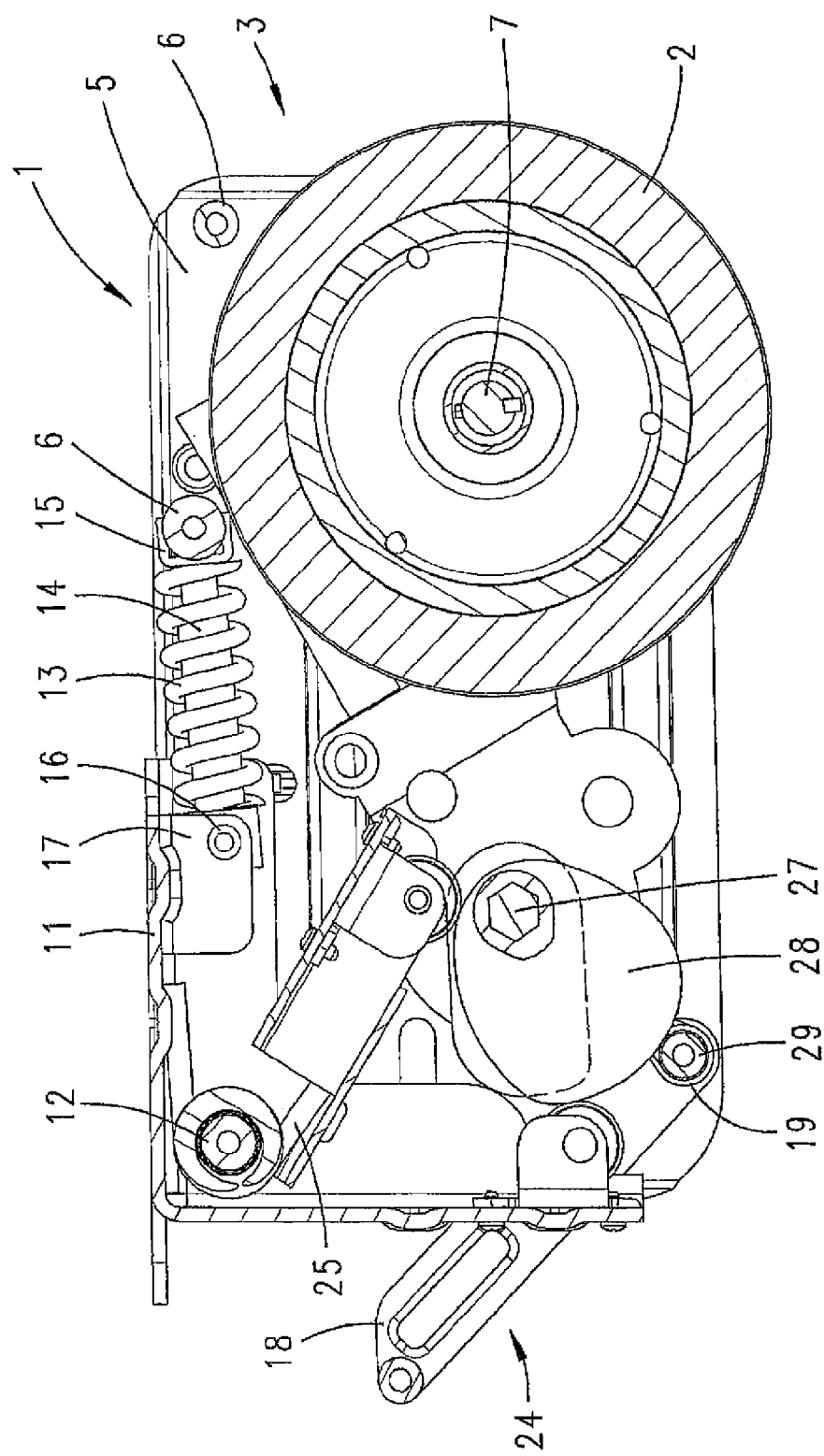
FIG. 4 shows a cross-section of the object according to FIG. 1, sectioned along the line IV-IV in FIG. 3.

In the raised position according to FIG. 4, the compression spring 13 acts in such a way that it presses the frame 3 into this raised position. In the lowered position (see FIG. 7, for example) the compression spring generates the primary force which presses the wheel 2 onto the ground. In addition, however, a lowering spring 25 which is preferably formed as a leg spring is also provided. The lowering spring 25 is also important in particular in that it allows the force component of the compression spring 13, which in the position corresponding to FIG. 4 acts in the raised position, to be overcome in the course of a lowering operation.

The compression spring 13 preferably exerts a force which is approximately 3 to 5 times, more preferably approximately 4 times, greater than that of the lowering spring 25.

The compression spring 13 moves together with the frame 3 about the pivot point which is fixed relative to the chassis, provided in the present case by the pivot pin 16, when the wheel 2 is raised and lowered.

As is apparent, the linking point of the compression spring 13 to the frame 3, in the present case by means of the transverse connection 6, is situated above the linking point 16 to the chassis in the raised position according to FIG. 4, even though the vertical distance is comparatively small. The distance is less than the distance that corresponds to a diameter of the compression spring 13, formed in the present case as a coil spring.

In a vertical projection as shown in the illustration in FIG. 1, for example, the compression spring 13 is located between the frame parts 4 and 5. In the raised state according to FIG. 4, the compression spring is also accommodated within the frame parts 4 and 5 in a horizontal projection. In the lowered state (see FIG. 7, for example) the compression spring may protrude from the frame over a portion of the length of the compression spring.

A downwardly projecting linkage formation 17 which accommodates the pivot pin 16 is provided on the mounting plate 11. A desired position of the pivot pin 16, which is lowered with respect to the transverse connection 6, is achieved in the raised state according to FIG. 4, for example.

Figure 12:
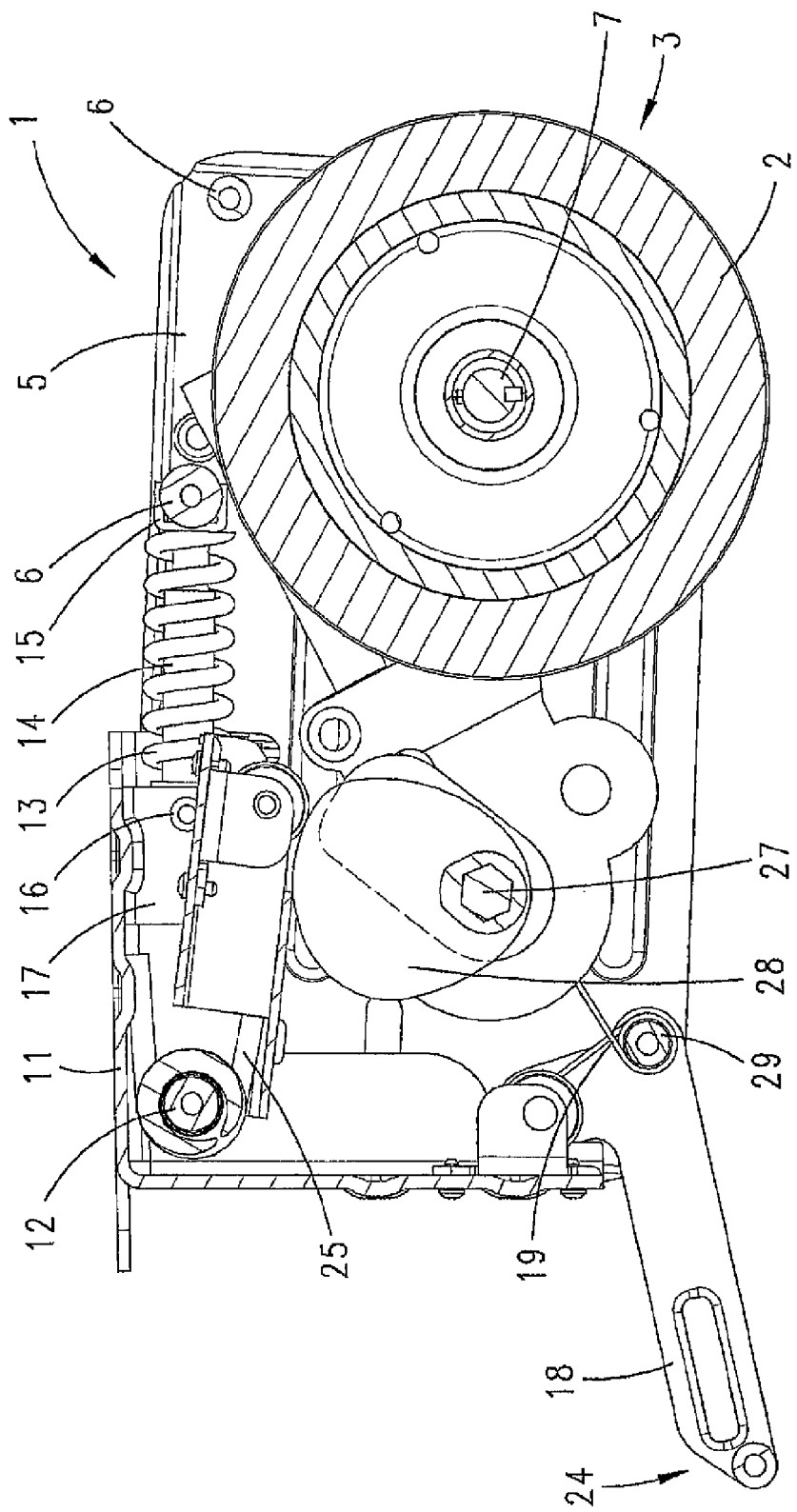
FIG. 12 shows the wheel in the raised position which is effected by means of the lever, in an illustration corresponding to FIG. 7.

In addition, an activating lever 18 is provided by means of which the wheel 2 together with the frame 3 is displaceable from a lowered position according to FIG. 7 or FIG. 8 into an at least partially raised position according to FIG. 12, solely by bodily power, for example.

The lever 18 on the one hand is pivotably situated via a further transverse connection 29 which, with respect to the illustration in FIG. 4, for example, is associated with a lower edge of the frame parts 4, 5. On the other hand, the activating lever 18 is also biased into a position according to FIG. 5 by means of a spring 19.

Figure 11:
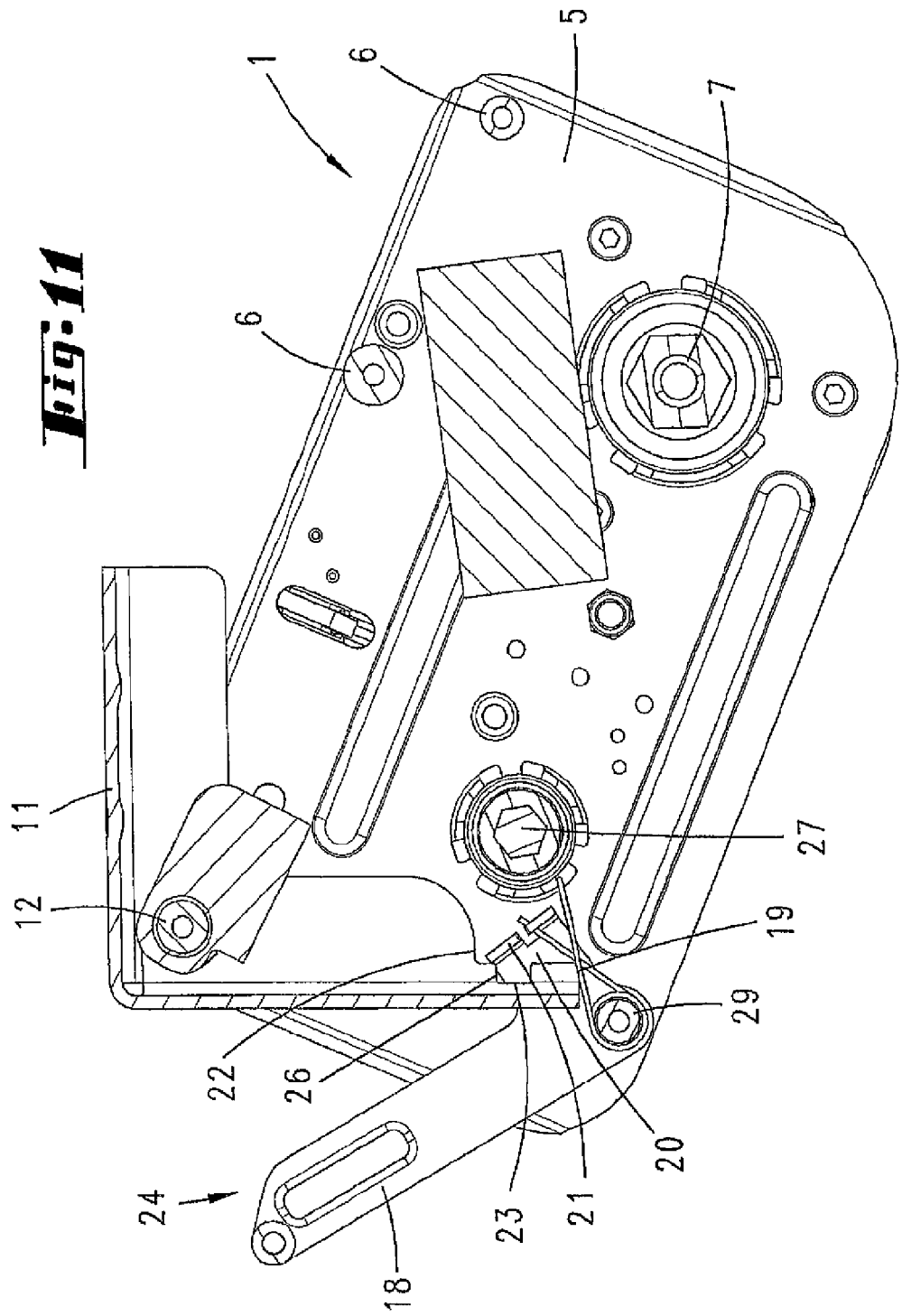
FIG. 11 shows an illustration corresponding to FIG. 8, but at the start of lifting the wheel by means of the lever.

The activating lever 18, of which preferably two are provided, as is apparent, extends approximately parallel to the frame parts 4, 5. The activating lever has an angled portion 20 which likewise extends approximately parallel to the frame parts 4, 5. This angled portion 20 also has a detent formation 21 which, in the activated state (see FIG. 11 or FIG. 13, for example), cooperates with a detent receptacle 22 or 23 formed on the mounting plate 11.

As is apparent, the mounting plate 11 extends at an angle in the cross-section. The detent receptacles 22, 23 are formed on a vertical portion of this angled mounting plate. In any case, the detent receptacles are fixed relative to the chassis.

A position corresponding to FIG. 13, for example, results after an action of force on the free end 24 of the activating levers 18. Due to the linkage of the frame parts 4, 5 to the pin 12, the angled portion 20 collides with the stepped surface 26 of the mounting plate 11, so that without further intervention it is not possible for the wheel 2 to move back into the lowered position from the position corresponding to FIG. 13.

Figure 5:
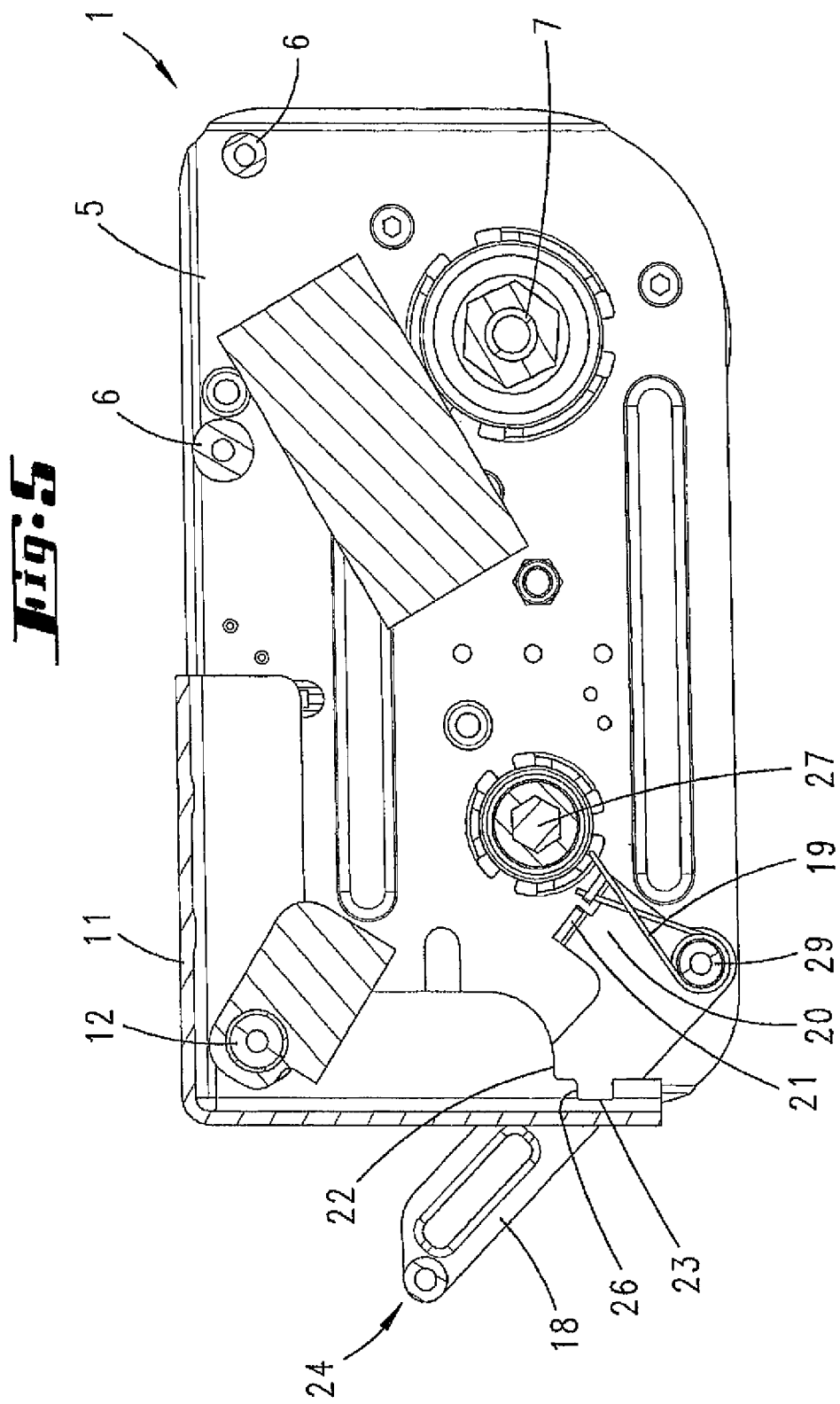
FIG. 5 shows another cross-section, sectioned along the line V-V in FIG. 3.
Figure 6:
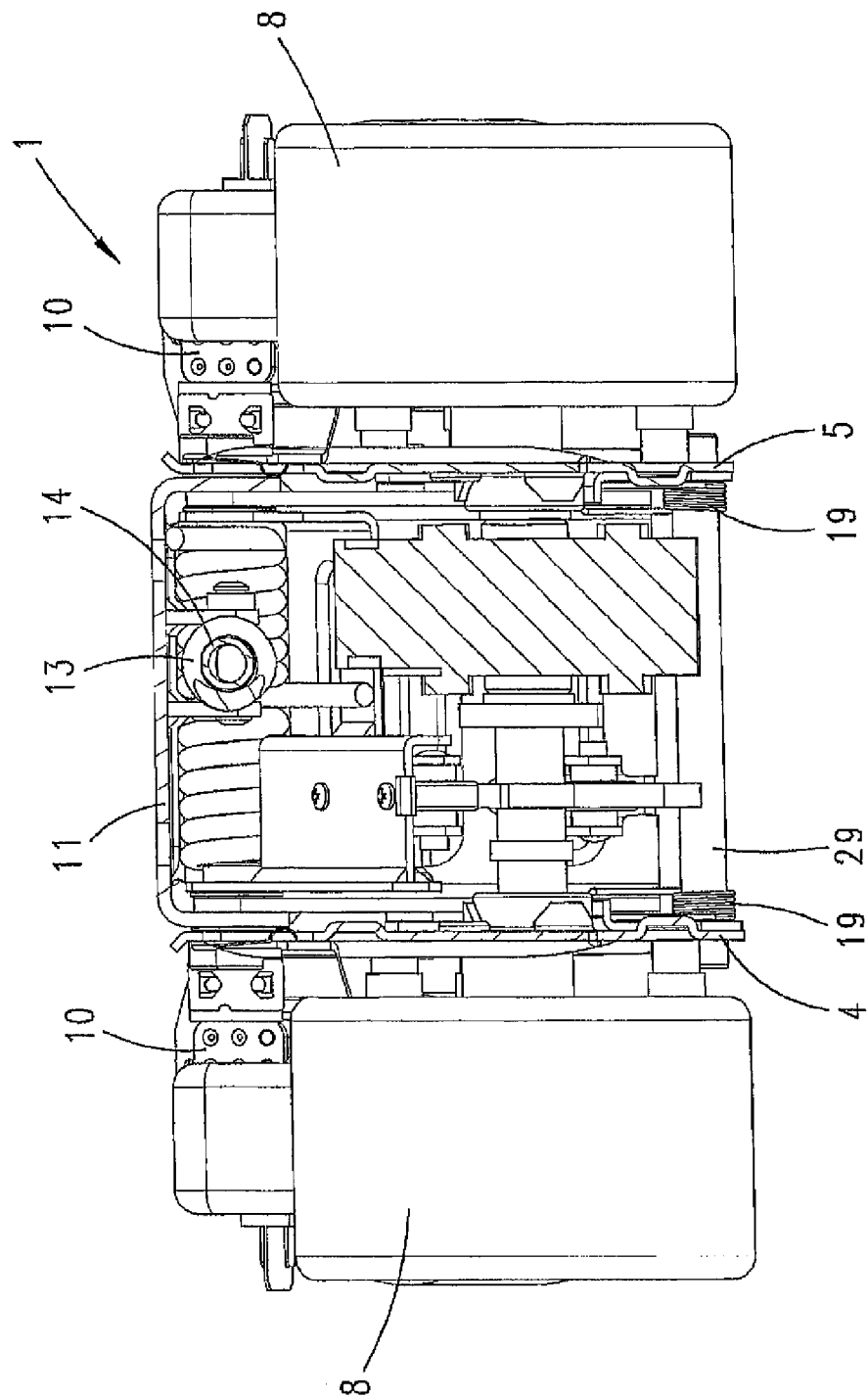
FIG. 6 shows a cross-section of the object according to FIG. 2, sectioned along the line VI-VI.
Figure 4:
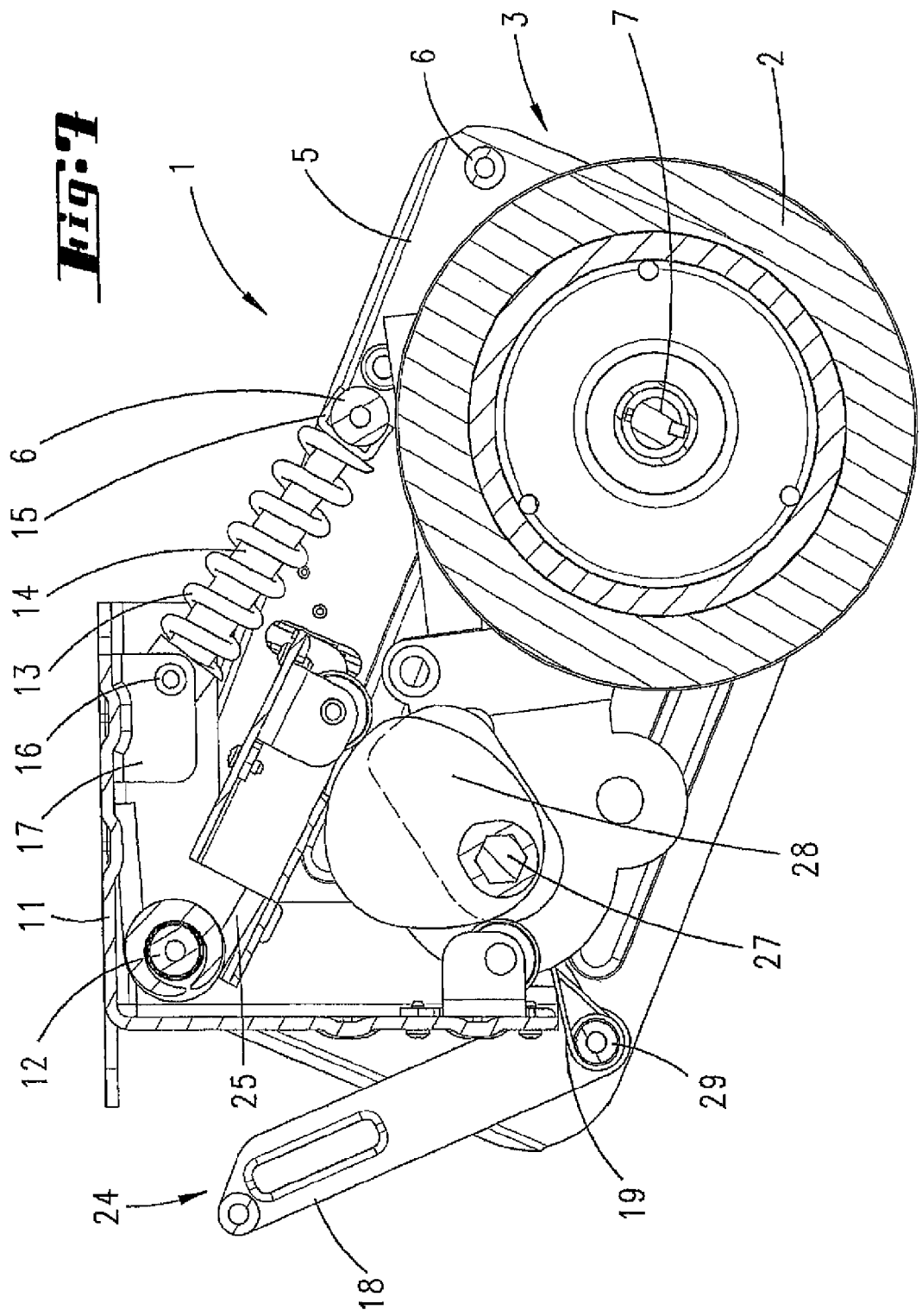
Figure 9:
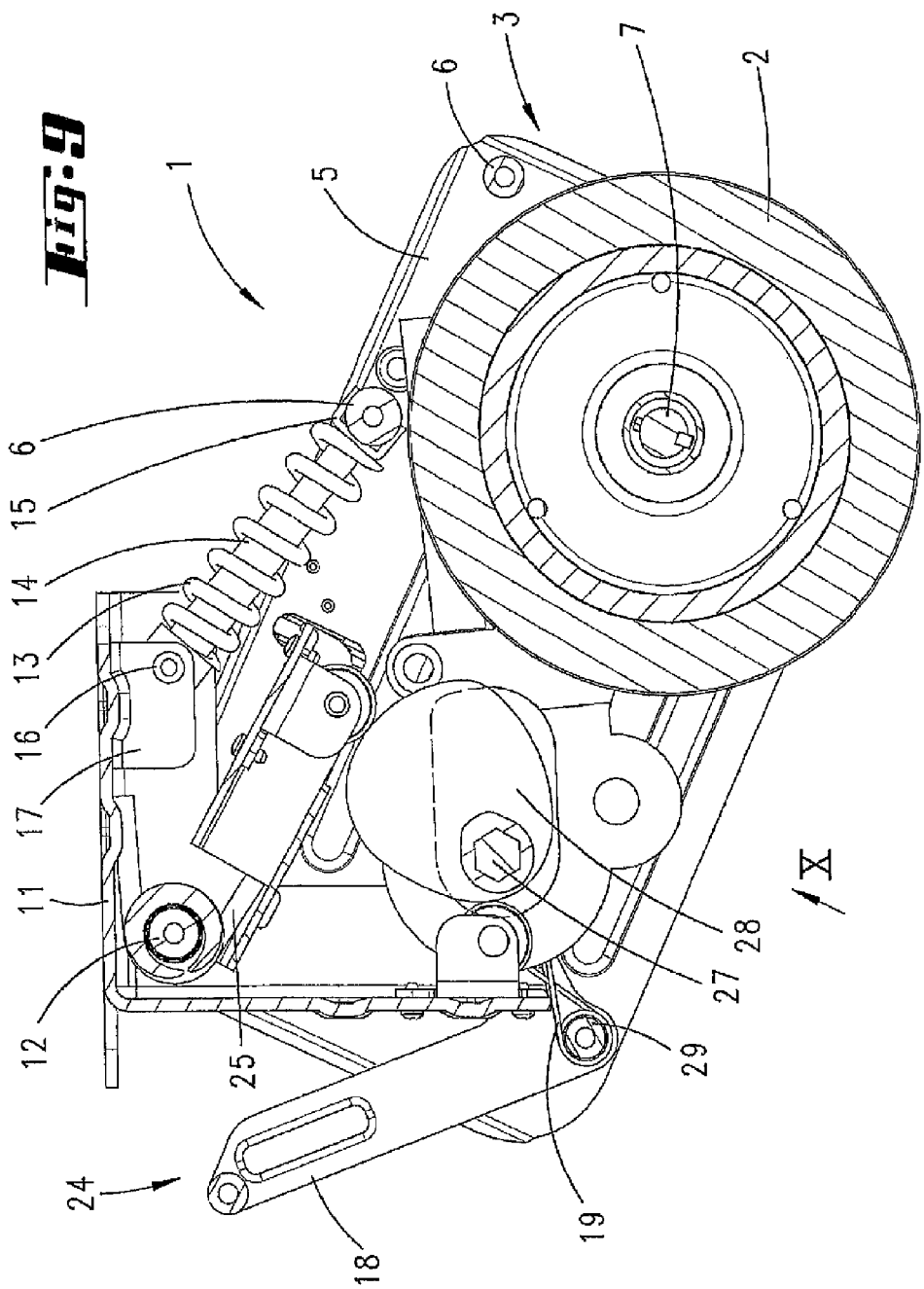
FIG. 9 shows an illustration corresponding to FIG. 7, but in an even further lowered state.
Figure 10:
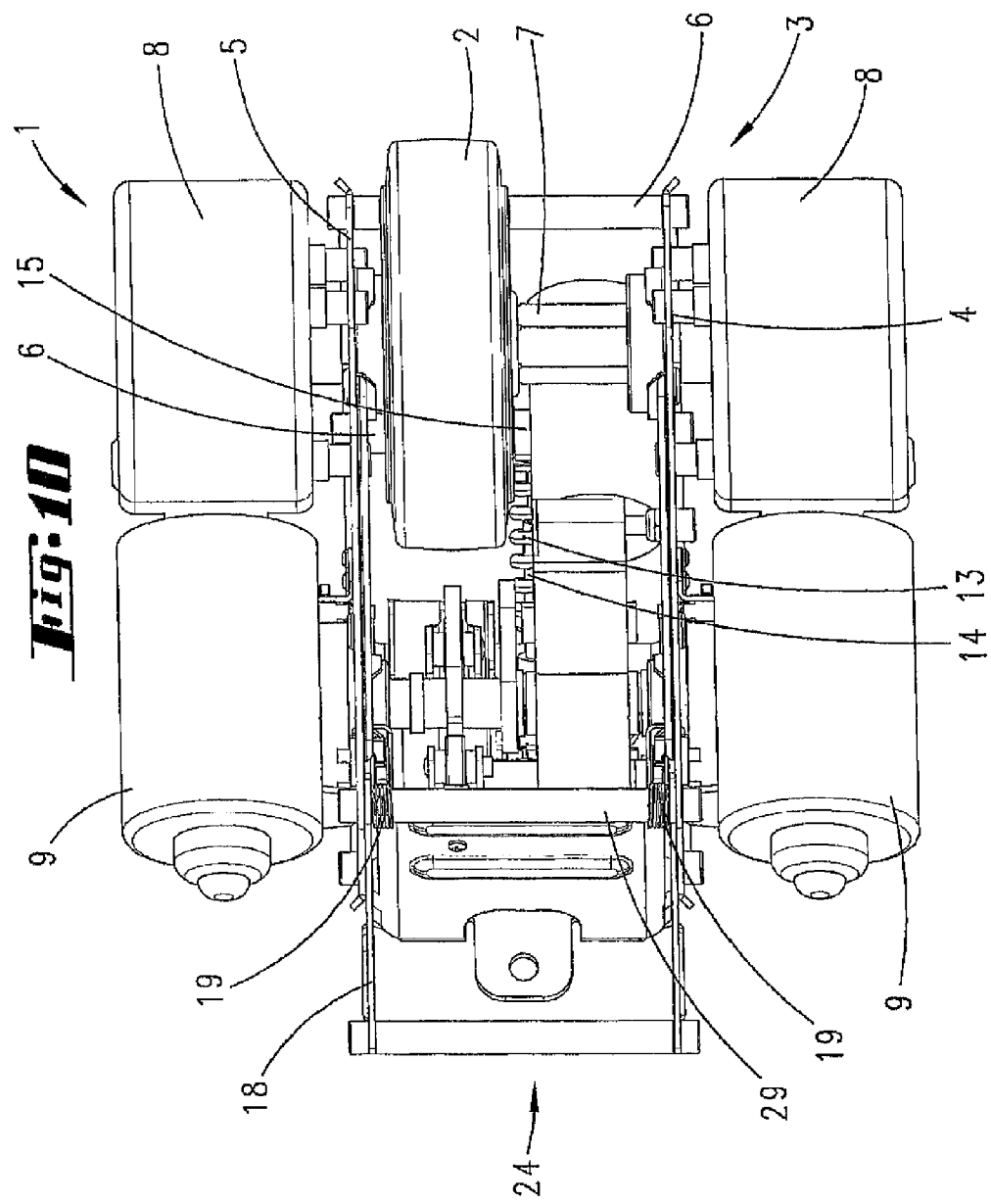
FIG. 10 shows an illustration in a view in the direction of the arrow X in FIG. 9.

However, as the result of a motorized activation of the shaft 27 in a customary manner, (further) raising may take place via the eccentric 28—in this regard also see the disclosure content of above-cited WO 2007/093549 A1—which raising, due to the action of the spring 19 allows the activating lever 18 to pivot back into the position corresponding to FIG. 5, after which a customary motorized activation of the wheel 2 is once again possible.

All features disclosed are (in themselves) pertinent to the invention. The disclosure content of the associated/accompanying priority documents (copy of the prior application) is also hereby included in full in the disclosure of the application, including for the purpose of incorporating features of these documents in claims of the present application. The subsidiary claims in their optional subordinated formulation characterize independent inventive refinement of the prior art, in particular to undertake divisional applications based on these claims.

LIST OF REFERENCE NUMERALS

| | |
|---|---|
| 1 | Structural unit |
| 2 | Auxiliary roller |
| 3 | Frame |
| 4 | Frame part |
| 5 | Frame part |
| 6 | Transverse connections |
| 7 | Shaft |
| 8 | Gearing |
| 9 | Electric motor |
| 10 | Connecting plug |
| 11 | Mounting plate |
| 12 | Pin |
| 13 | Compression spring |
| 14 | Telescoping tube |
| 15 | Clip ends |
| 16 | Pivot pin |
| 17 | Linkage formation |
| 18 | Activating lever |
| 19 | Spring |
| 20 | Angled portion |
| 21 | Detent formation |
| 22 | Detent receptacle |
| 23 | Detent receptacle |
| 24 | Free end |
| 25 | Lowering spring |
| 26 | Stepped surface |
| 27 | Shaft |
| 28 | Eccentric |
| 29 | Transverse connection |

The invention claimed is:

1. An auxiliary roller having a rigid frame, with a drivable wheel which is mounted in the frame and which has an axle, the wheel together with the frame, by pivoting, being raisable or lowerable relative to a chassis to which the auxiliary roller is to be attached, via a mounting plate being part of the auxiliary roller, and a compression spring which is rotatably linkable at one end to the chassis via the mounting plate, the compression spring being provided in order to load the wheel with regard to ground contact in the lowered position, wherein a transverse connection connecting two frame parts in the direction of the axle of the wheel is provided, wherein the two frame parts surround the wheel and extend longitudinally along the auxiliary roller, wherein the compression spring is directly connected at the other end to the transverse connection, and wherein the compression spring together with the two frame parts pivots about a pivot point which is fixed relative to the chassis, when the wheel is raised and lowered.

2. The auxiliary roller according to claim 1 wherein the compression spring is linked to the transverse connection in the raised state of the wheel at a first linking point and the wheel is linked to the chassis at a second linking point, and wherein the first linking point is situated above the second linking point.

3. The auxiliary roller according to claim 1, wherein a guide rod passes through the compression spring.

4. The auxiliary roller according to claim 3, wherein the guide rod has a telescoping capability.

5. The auxiliary roller according to claim 1, wherein the compression spring is situated in a vertical projection within the frame.

6. The auxiliary roller according to claim 1, wherein two electric motors are provided to drive the wheel, wherein the electric motors are situated on opposite sides relative to the wheel, and wherein further both electric motors act directly on the same shaft of the wheel.

7. The auxiliary roller according to claim 1, wherein the wheel is drivable by at least one electric motor, and wherein the at least one electric motor is switchable to a generator.

8. An auxiliary roller according to claim 7, wherein the at least one electric motor is drivable in two directions.

9. An auxiliary roller according to claim 7, wherein the at least one electric motor comprises first and second electric motors situated on opposite sides relative to the wheel, wherein both the first and second electric motors act directly on the same shaft of the wheel.

10. An auxiliary roller having a rigid frame with a drivable wheel which is mounted in the frame, the wheel, together with the frame, by pivoting, being raisable or lowerable relative to a chassis to which the auxiliary roller is to be attached, wherein an outwardly protruding activating lever is linked to the frame for pivoting the wheel into the raised position without motorized assistance, wherein further the lever extends in general parallel to frame parts of the auxiliary roller, wherein the lever has an outwardly protruding end and is configured so that force on the outwardly protruding end pivots the wheel into a first raised position, wherein the lever comprises a detent formation and the auxiliary roller has a mounting plate comprising a detent receptacle, and wherein in the first raised position the detent formation engages with a wall of the detent receptacle so that the wall of the detent receptacle blocks the detent formation and the lever and impedes the wheel from being lowered.

11. The auxiliary roller according to claim 10, wherein the lever is pivotable relative to the frame and also relative to the mounting plate or to the chassis.

12. The auxiliary roller according to claim 10, wherein the lever is biased into its position which enables the lowered position of the wheel.

* * * * *